United States Patent

[11] 3,542,229

| [72] | Inventors | Ludwig Beyerlein<br>Waltenhofen;<br>Otto Lachner, Kempten; Peter Limpacher, Neuss; Winfried Merz, Gottingen-Weende, Germany |
|---|---|---|
| [21] | Appl. No. | 782,954 |
| [22] | Filed | Dec. 11, 1968 |
| [45] | Patented | Nov. 24, 1970 |
| [73] | Assignee | Lever Brothers Company<br>New York, New York<br>a corporation of Maine |
| [32] | Priority | Dec. 15, 1967 |
| [33] | | Germany |
| [31] | | No. 1,607,932 |

[54] PLASTIC BOTTLE WITH SHRUNK STRENGTHENING BAND
5 Claims, 8 Drawing Figs.

[52] U.S. Cl. .................................................... 215/1;
40/310; 156/86; 215/7, 215/12

[51] Int. Cl. .................................................... B65d 23/08
[50] Field of Search ............................. 215/1.5, 12, 7; 156/86; 40/306, 310

[56] References Cited
UNITED STATES PATENTS

| 2,654,171 | 10/1953 | Nestor | 40/310 |
| 2,959,812 | 11/1960 | Allen | 215/12UX |
| 3,110,554 | 11/1963 | Yazumi | 156/86X |
| 3,480,168 | 11/1969 | Lee | 215/12X |

*Primary Examiner* — Donald F. Norton
*Attorney* — Louis F. Kline, Jr.

ABSTRACT: The bursting strength of a bottle of thermoplastic material is increased by applying about the body of the bottle a shrunk-on band of stretchable heat-shrinkable plastics film which is under tensile stress and prestresses the bottle body.

Patented Nov. 24, 1970  3,542,229

INVENTORS:
Ludwig Beyerlein, Otto Lachner
Peter Limpacher and Winfried Merz
By  *Louis L. Kline, Jr.*
Their Attorney

PLASTIC BOTTLE WITH SHRUNK STRENGTHENING BAND

The invention relates to a process for increasing the strength of containers made of thermoplastic material and containers manufactured according to this invention, which preferably have the shape of a bottle.

Thermoplastic materials have already been used for manufacturing containers and, in particular, also bottles, which are preferably made by blow moulding. The use of these bottles for liquids under pressure, however, presents difficulties. Attempts have been made also to make the bottles usable for liquids such as beer and other beverages containing carbon dioxide by selecting an extremely thick wall for the bottles or containers. Due to the heavy weight of the raw material required for such plastics bottles, however, they are too expensive as compared with glass bottles.

It has already been suggested to fit bottles which are to be blown from a thin-walled preform with a band for the main body section of the bottle by inserting the band into the blow mould before the bottle is blown. Apart from the difficulties which arise when the band is inserted into the blow mould, undesirable deformations can easily occur in the inserted band as a result of the relatively high temperature in the blow mould if the band is of thermoplastic material. If, however, the band is so thick-walled that such deformations can be discounted, undesirable deformations occur in the body of the bottle itself, for instance ridges at the edges of the band, where the bottle can easily break. Moreover, putting a band into the blow mould lengthens the cooling times, since the transmission of heat to the cooled wall of the mould deteriorates. Such a band may protect a bottle against damage from external factors up to a point, but it cannot substantially resist stress due to high internal pressure, which arises particularly in the direction of the bottle circumference (U.S. Pat. No. 2,959,812).

It is also known to provide cylindrical containers with an annular label of a thermoplastic material shrunk on in a hot atmosphere, which is printed on one side or covers the printed surface of a container in the form of a protective cover. These labels, however, are made of a very thin film of for example, only slightly orientated polyvinyl chloride, and can therefore hardly increase the strength of the body of the container (Modern Packaging, July 1967, page 121).

In order to provide durable labeling for tin cans, labels of synthetic resin film have been shrunk on (U.S. Pat. No. 3,110,554).

The object of the invention is to increase the bursting strength of thin-walled plastics containers manufactured from a low initial weight of material, particularly plastics bottles for liquids under pressure.

According to the invention, a method of increasing the bursting strength of a container of thermoplastic material comprises applying a band of stretchable heat-shrinkable plastics film material of thickness 70 to 200 microns which has previously been stretched in the direction of the circumference of the band to a stretch ratio in the range 1:2 to 1:4, which band before application has a circumferential dimension 2 to 5 percent larger than that of the container, application being effected by locating the band upon the container for the band to encompass a portion of the container body between its ends, and heat-shrinking the band so that it encircles and grips the container body with the band under tensile stress and with the band prestressing the container body.

A container of thermoplastics material of increased bursting strength may, according to the invention, have a shrunk-on band which consists of one, two, or more, plastics films shrunk on successively. Both the bottle and the band are preferably of polyvinyl chloride.

The plastics bottle is preferably made of polyvinyl chloride, because this material has good impermeability to gas. Polyvinyl chloride is also preferred for the band in accordance with the invention. A different thermoplastic material may, however, be used, the strength characteristics of which can be improved by stretching and the consequent orientation of the molecules, e.g. polyvinylidene chloride.

It is known that the strength of thermoplastic materials deteriorates in time when subjected to stress. In addition to the stretching known as cold flow the phenomenon known as creep also occurs. This means that although a light thin-walled bottle in which there is internal pressure is still sufficiently strong a short time after filling, it can be ruptured after a few weeks by the internal pressure due to a deterioration in strength.

The thin-walled polyvinyl chloride bottles fitted with a band made of stretched film in accordance with the invention not only have a greater bursting strength as a result of the prestress exerted on the wall of the bottle, but also have better creep rupture strength, which is important for bottles which are stored for some time.

The band is preferably 110—150 microns thick. It consists of one or several films shrunk on successively, which have been stretched to a stretch ratio preferably in the range 1:2.5 to 1:3.5. This stretch ratio is only slightly reduced by the shrinking-on operation and this causes no noticeable deterioration in the band strength characteristics, because the diameter of the bands must be only just large enough to allow the band to be slipped over the body of the bottle without difficulty.

The burst strength of a banded bottle increases with the width of the band. The width of the band can be selected in relation to the burst strength required. It may well be the case, for instance, that a sufficiently high burst strength is achieved with band widths of less than 90 percent and even less than 80 percent of the cylindrical part of the body of a bottle, but it may also be desirable to select a band width larger than that of the cylindrical part of the body. In the latter case a special advantage of the shrunk-on band enclosing the bottle under stress is that it can also prestress the double-curved transitional zones outside the cylindrical part of the main body at the base and the neck. This may sometimes be desirable, in particular to achieve decoration of the bottles, for example where printing on the neck or the shoulder of the bottle is to be protected.

A further substantial advantage of the shrunk-on band is that the wall of the bottle formed from the combination of bottle and band generally has a much better evenness of total wall thickness than is the case with an unbanded bottle, because the wall thickness produced in blow moulding generally shows variations of 10 percent or more, whereas the thickness variations in stretched films are much less than 10 percent.

The band, which is primarily intended to increase the bursting strength, may, as is known, be transparent and printed on the inner side, the band protecting the printing from damage.

The band can be produced without a seam from tubular film, the diameter of which after stretching is 2 to 5 percent, and preferably about 3 percent, larger than the diameter of the body of the bottle. It is also possible, however, to form the band from an offcut of a flat film; this offcut being shaped into a ring and its ends being joined by gluing, sealing or welding after it has been printed on the inner side if required but before it is slipped over the bottle.

The band can consist of a single polyvinyl chloride film or of a multilayer laminate. However, it can also consist of several films which are shrunk on in succession. This is better, particularly with thicker bands, because polyvinyl chloride is a poor conductor of heat and the time required for shrinking on thick films is therefore comparatively long.

If several films are shrunk on successively in the form of a band it may be an advantage to select the individual films in different widths depending on the stress on the material in the various parts of the bottle. The first film, therefore, can also cover the zones of transition to the neck and the base of the bottle, whereas a second film only encloses the centre of the cylindrical part of the body of the bottle on all sides.

The compression-resistant plastics bottle in accordance with the invention is described once more below with the help of the diagrams:

Figure 1A:
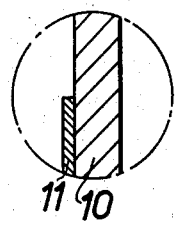
FIG. 1a shows the section A from FIG. 1 on a larger scale.
Figure 2A:
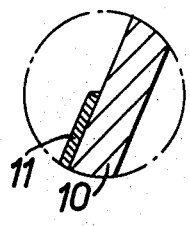
FIG. 2a is an enlarged section B from FIG. 2.
Figure 1:
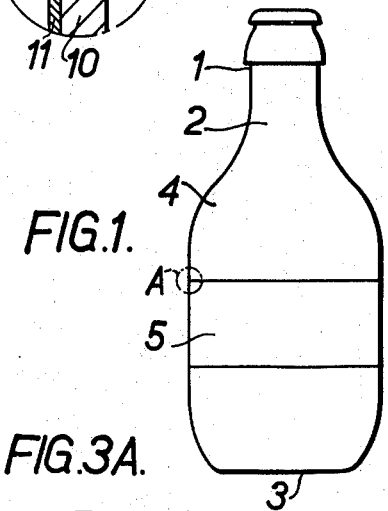
FIG. 1 shows a bottle with a shrunk-on band, the width of which is about 70 percent of the cylindrical part of the body of the bottle.
Figure 2:
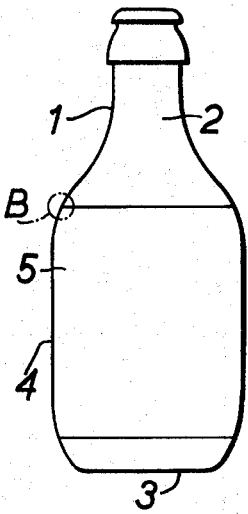
FIG. 2 shows a bottle with a single layer band which also partly covers the zones of transition to the neck and the base.

In the drawings the bottle is designated 1, its neck 2, and its base 3. The shape of the bottle is optional, but bottles of which the body 4 has a cylindrical part are preferred. The band in general is designated 5.

Figure 3A:
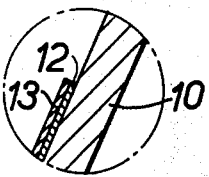
FIG. 3a is an enlarged section C from FIG. 3.

In the enlarged sectional views 10 is the wall of the bottle. 11 is a single layer band. FIG. 3a shows a multilayer band, which consists, for example, of two films 12 and 13 shrunk on successively. However, 12 can also be a film and 13 a layer laminated to it before the film is shrunk on.

Figure 4A:
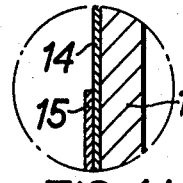
FIG. 4a is an enlarged section D from FIG. 4.
Figure 3:
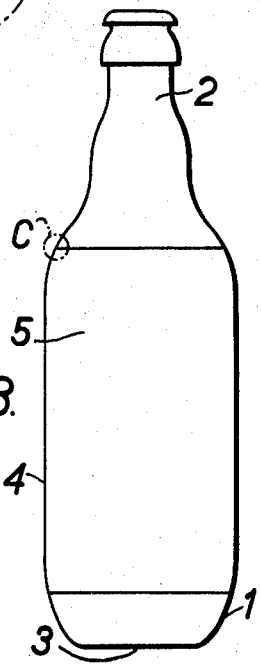
FIG. 3 shows a bottle with a multilayer band.
Figure 4:
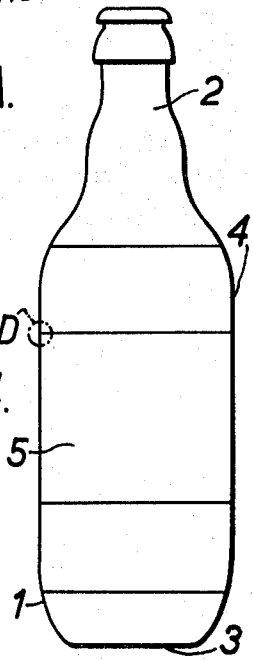
FIG. 4 shows a bottle with a multilayer band, the first shrunk-on film of which also partly encloses the zones of transition to the neck and the base and the subsequently shrunk-on film of which only encloses part of the cylindrical body of the bottle.

In FIG. 4a 14 is a film which also extends over the zones of transition to the neck 2 and the bottom part 3, and 15 is a film shrunk on later, which only surrounds part of the cylindrical body 4.

The band may, of course, also consist of more than two layers of films. The bands illustrated are made either of a seamless tubular film or have been made into a ring or tube by gluing, sealing or welding before they are shrunk on. The point where the sides of the film offcut are joined is not shown on the drawings. All the bands fit round the periphery of the bottles in a prestressed state owing to the shrinking-on of the material which has been stretched circumferentially.

It has been found that a polyvinyl chloride bottle fitted with a band according to the invention and having a capacity of 0.33 litres and a shape similar to that of a normal beer bottle, weighing about 28 g., can be made of improved strength with a band only 3 cm. wide of a film 70 microns thick stretched in the ratio of 1:2. The bursting strength of this banded bottle is much higher than that of a comparative unbanded bottle of the same weight. Surprisingly, this banded bottle had the same bursting strength as an unbanded bottle weighing 38 g. The strength can be increased still further by making the band wider. A thicker band of, for example 110 microns, gives both still greater bursting strength and less deterioration in strength with time.

The advantages of the invention are, in particular, that with the stretched polyvinyl chloride band a pressure-resistant plastics bottle is obtained which is of exceptionally low weight as compared with the normal plastics bottles of the same strength. The stretched polyvinyl chloride band also makes it possible to transfer the advantages of high creep rupture strength to the plastics bottle. Furthermore, because the band is very transparent it is possible for it to be printed on the inner side, and the body of the bottle itself may also be printed, which is a particular advantage because this protects the print from scratching or other damage.

We claim:

1. In a pressure-resistant bottle of thermoplastic material having a body portion a neck portion and a base portion, the combination with said bottle of a shrunk-on body-encircling band of stretchable heat-shrinkable plastics film material of thickness 70 to 200 microns, which band before being applied to the bottle had a circumferential dimension 2 to 5 percent larger than that of the bottle and had been stretched in the direction of the circumference of the band to a stretch ratio in the range 1:2 to 1:4, the shrunk on band being under tensile stress and functioning to prestress the bottle body and increase its bursting strength.

2. A pressure-resistant bottle according to claim 1, wherein the thickness of the band is 110 to 150 microns, and the band had been stretched before application to a stretch ratio in the range 1:2.5 to 1:3.5.

3. A pressure-resistant bottle according to claim 1, wherein the shrunk-on band consists of at least two plastics films shrunk on successively.

4. A pressure-resistant bottle according to claim 1, wherein the body portion is cylindrical and the shrunk-on band is wider than the axial extent of the cylindrical portion of the body.

5. A pressure-resistant bottle according to claim 1, wherein both the bottle and the band are of polyvinyl chloride.